(12) United States Patent
Stoianovici et al.

(10) Patent No.: US 12,465,336 B2
(45) Date of Patent: Nov. 11, 2025

(54) REMOTE CENTER OF MOTION ROBOT

(71) Applicant: THE JOHNS HOPKINS UNIVERSITY, Baltimore, MD (US)

(72) Inventors: Dan Stoianovici, Reisterstown, MD (US); Doru Petrisor, Lutherville, MD (US); Changhan Jun, College Park, MD (US); Sunghwan Lim, Baltimore, MD (US)

(73) Assignee: The Johns Hopkins University, Baltimore, MD (US)

( * ) Notice: Subject to any disclaimer, the term of this patent is extended or adjusted under 35 U.S.C. 154(b) by 759 days.

(21) Appl. No.: 17/404,741

(22) Filed: Aug. 17, 2021

(65) Prior Publication Data

US 2021/0369253 A1 Dec. 2, 2021

Related U.S. Application Data

(63) Continuation of application No. 16/098,284, filed as application No. PCT/US2017/030958 on May 4, 2017, now abandoned.
(Continued)

(51) Int. Cl.
*A61B 34/30* (2016.01)
*A61B 5/055* (2006.01)
(Continued)

(52) U.S. Cl.
CPC ............ *A61B 10/025* (2013.01); *A61B 34/30* (2016.02); *A61B 90/03* (2016.02); *A61B 90/50* (2016.02);
(Continued)

(58) Field of Classification Search
CPC ....... A61B 10/025; A61B 34/30; A61B 90/03; A61B 90/11; A61B 90/50;
(Continued)

(56) References Cited

U.S. PATENT DOCUMENTS 5,397,323 A 3/1995 Taylor et al.
6,296,614 B1 10/2001 Pruter
(Continued)

FOREIGN PATENT DOCUMENTS

| RU | 2004229 C1 | 12/1993 | |
|---|---|---|---|
| RU | 139309 U1 | 4/2014 | |
| WO | WO-2014058833 A1 * | 4/2014 | ......... A61B 10/0241 |

OTHER PUBLICATIONS

Cole, et al., Design of a Robotic System for MRI-Guided Deep Brain Stimulation Electrode Placement. 2009 IEEE International Conference on Robotics and Automation. 2009:4450-4456.
(Continued)

*Primary Examiner* — Tan-Uyen T Ho
*Assistant Examiner* — Cherie M Poland

(57) ABSTRACT

An embodiment in accordance with the present invention provides a remote center of motion robot. The RCM here is a parallelogram bar type RCM mechanism with a novel joint arrangement. The novel joint arrangement facilitates the mounting of the medical instrument and offers improved clearance relative to the patient. Moreover, the robot was built to guide a bone biopsy cannula, needle, or drill. Even though exact interventional values are unknown, it is expected that the forces exerted laterally on the needle-guide are higher than those encountered for slender needle insertion into soft tissue. For this, the RCM has been built with novel structure to enhance stiffness.

11 Claims, 7 Drawing Sheets

Related U.S. Application Data

(60) Provisional application No. 62/331,729, filed on May 4, 2016.

(51) Int. Cl.
*A61B 10/02* (2006.01)
*A61B 90/00* (2016.01)
*A61B 90/11* (2016.01)
*A61B 90/50* (2016.01)
*B25J 9/00* (2006.01)

(52) U.S. Cl.
CPC .............. *B25J 9/003* (2013.01); *A61B 5/055* (2013.01); *A61B 2010/0208* (2013.01); *A61B 2090/034* (2016.02); *A61B 90/11* (2016.02); *A61B 2090/506* (2016.02)

(58) Field of Classification Search
CPC ........ A61B 2090/034; A61B 2090/506; A61B 5/055; A61B 2010/0208; B25J 9/003
See application file for complete search history.

(56) References Cited

U.S. PATENT DOCUMENTS

| | | | | |
|---|---|---|---|---|
| 7,322,990 | B1* | 1/2008 | Mark | A61B 90/11 604/116 |
| 2005/0043718 | A1* | 2/2005 | Madhani | A61B 34/76 606/1 |
| 2007/0089557 | A1* | 4/2007 | Solomon | A61B 34/71 74/490.01 |
| 2008/0314181 | A1* | 12/2008 | Schena | A61B 34/70 310/112 |
| 2010/0041938 | A1* | 2/2010 | Stoianovici | A61B 34/30 600/7 |
| 2014/0039314 | A1* | 2/2014 | Stoianovici | A61B 8/0841 600/439 |
| 2015/0374406 | A1* | 12/2015 | Song | A61B 17/3403 604/95.01 |

OTHER PUBLICATIONS

Taylor, et al., Medical robotics in computer-integrated surgery. IEEE Transactions on Robotics and Automation. Oct. 2003;19(5):765-781.
Mozer, et al., Robotic Image-Guided Needle Interventions of the Prostate. Rev Urol. 2009 Winter, 11(1):7-15.
Cleary, et al., Interventional Robotic Systems: Applications and Technology State-of-the-Art. Minim Invasive Ther Allied Technol. 2006;15(2):101-113.
Stoianovici, Technology Advances for Prostate Biopsy and Needle Therapies. J Urol. Oct. 2012;188(4):1074-5.
Stoianovici, Multi-Imager Compatible Actuation Principles in Surgical Robotics. Int J Med Robot. Jan. 2005; 1(2):86-100.
Elhawary, et al., The case for MR-compatible robotics: a review of the state of the art. Int J Med Robot. Jun. 2008;4(2):105-13.
Fischer, et al., MRI compatibility of robot actuation techniques—a comparative study. Med Image Comput Comput Assist Interv. 2008;11(Pt 2):509-517.
Tokuda, et al., Preclinical evaluation of an MRI-compatible pneumatic robot for angulated needle placement in transperineal prostate interventions. Int J Comput Assist Radiol Surg. Nov. 2012;7(6):949-57.
Tse, et al., A 3-DOF MR-compatible device for magic angle related in vivo experiments. Ieee-Asme Transactions on Mechatronics. Jun. 2008;13(3):316-324.
Zangos, et al., MR-compatible assistance system for punction in a high-field system: device and feasibility of transgluteal biopsies of the prostate gland. Eur Radiol. Apr. 2007;17(4):1118-24.
Yakar, et al., Feasibility of a pneumatically actuated MR-compatible robot for transrectal prostate biopsy guidance. Radiology. Jul. 2011;260(1):241-7.
Schouten, et al., The accuracy and safety aspects of a novel robotic needle guide manipulator to perform transrectal prostate biopsies. Med Phys. Sep. 2010;37(9):4744-50.
Muntener, et al., Transperineal prostate intervention: robot for fully automated MR imaging—system description and proof of principle in a canine model. Radiology. May 2008;247(2):543-9.
Stoianovici, et al., MRI-Safe Robot for Endorectal Prostate Biopsy. Ieee-Asme Transactions on Mechatronics. Aug. 2014;19(4):1289-1299.
Srimathveeravalli, et al., MRI-Safe Robot for Targeted Transrectal Prostate Biopsy: Animal Experiments. BJU Int. Jun. 2014;113(6):977-85.
Stoianovici, et al., MR Safe Robot, FDA Clearance, Safety and Feasibility Prostate Biopsy Clinical Trial. IEEE ASME Trans Mechatron. Feb. 2017;22(1):115-126.
Ball, et al., Safety and Feasibility of Robot-Assisted Direct MRI-Guided Transperineal Prostate Biopsy. Urology. Nov. 2017;109:216-221.
Kanal, et al., ACR guidance document for safe MR practices: 2007. AJR Am J Roentgenol. Jun. 2007;188(6):1447-74.
Tsekos, et al., A general-purpose MR-compatible robotic system: implementation and image guidance for performing minimally invasive interventions. IEEE Eng Med Biol Mag. May-Jun. 2008;27(3):51-8.
Kuo, et al., Kinematic design considerations for minimally invasive surgical robots: an overview. Int J Med Robot. Jun. 2012;8(2):127-45.
Salcudean, et al., A robot system for medical ultrasound. Robot Res. 2000:195-202.
Li, et al., Robotic System for MRI-Guided Stereotactic Neurosurgery. IEEE Trans Biomed Eng. Apr. 2015;62(4):1077-88.
Stoianovici, et al., AcuBot: A Robot for Radiological Interventions. EEE Transactions on Robotics and Automation. Oct. 2003;19(5):927-930.
Taylor, et al., A Telerobotic Assistant for Laparoscopic Surgery. IEEE Engineering in Medicine and Biology Magazine. May/Jun. 1995;14(3):279-288.
Uneri, et al., New Steady-Hand Eye Robot with Micro-Force Sensing for Vitreoretinal Surgery. Proc IEEE RAS EMBS Int Conf Biomed Robot Biomechatron. Sep. 1, 2010;2010(26-29):814-819.
Stoianovici, et al., A New Type of Motor: Pneumatic Step Motor. IEEE ASME Trans Mechatron. Feb. 1, 2007;12(1):98-106.
Gijbels, A., et al., "Design and Realisation of a Novel Robotic Manipulator for Retinal Surgery" 2013 IEEE/RSJ International Conference on Intelligent Robots and Systems (IROS) Nov. 3-7, 2013. Tokyo, Japan.
Boctor, E., et al., "Virtual Remote Center of Motion Control for Needle Placement Robots" LNCS 2878, pp. 157-164, 2003.

\* cited by examiner

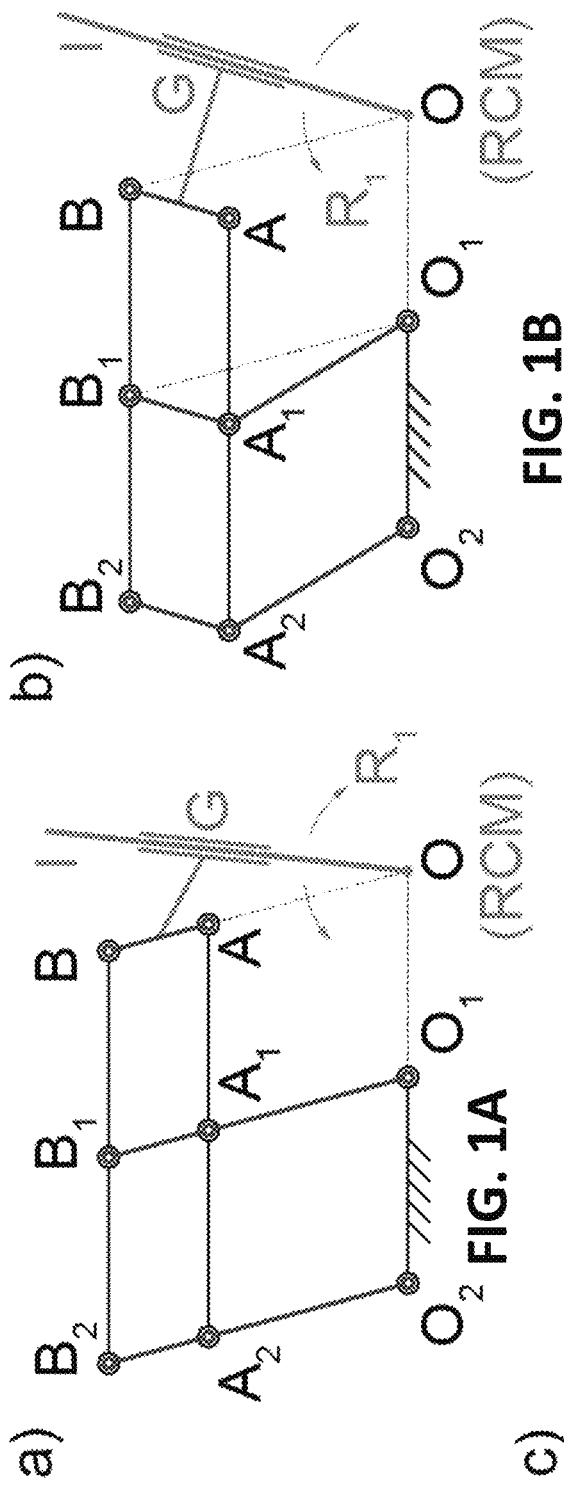
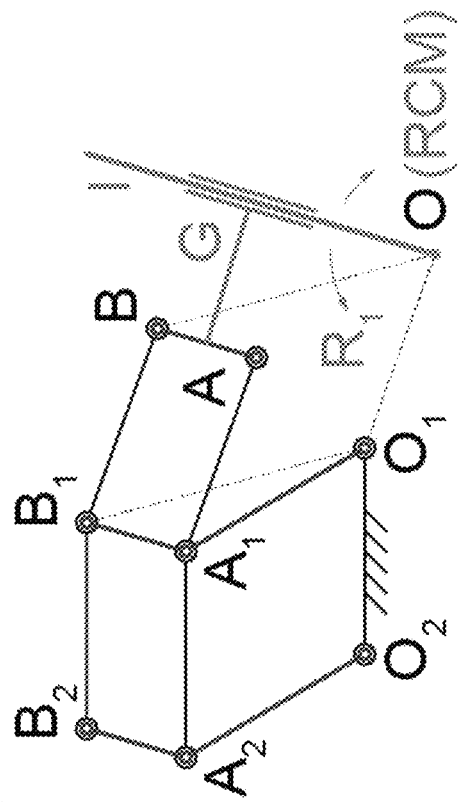
FIG. 1A
FIG. 1B
FIG. 1C

REMOTE CENTER OF MOTION ROBOT

CROSS-REFERENCE TO RELATED APPLICATIONS

This application is a Continuation of U.S. patent application Ser. No. 16/098,284 filed Nov. 1, 2018, which is a 35 U.S.C. § 371 U.S. national entry of International Application PCT/US2017/030958, having an international filing date of May 4, 2017, which claims the benefit of U.S. Provisional Application No. 62/331,729, filed May 4, 2016, the content of each of the aforementioned applications is herein incorporated by reference in their entirety.

GOVERNMENT SUPPORT

This invention was made with government support under grant number CA172244 awarded by the National Institutes of Health. The government has certain rights in the invention.

FIELD OF THE INVENTION

The present invention relates generally to medical devices. More particularly, the present invention relates to a remote center of motion robot.

BACKGROUND OF THE INVENTION

Image-guided interventions (IGI) may be performed based on pre-acquired images, but using the imager at the time of the intervention to directly (DIGI) guide the procedure improves quality control. These often require special devices such as medical robots to help the physician and improve accuracy. Compatibility of robotic devices with the imaging equipment has been a challenging engineering task, especially with the magnetic resonance (MR) environment.

The highest class of compatibility of devices with the MR environment is MR Safe, according to the American Society for Testing and Materials standard ASTM F2503-13. In the United States compliance to this standard is mandated by the Food and Drug Administration (FDA) for clinical use. These are devices "that poses no known hazards resulting from exposure to any MR environment. MR Safe items are composed of materials that are electrically nonconductive, nonmetallic, and nonmagnetic".

Traditional active robotic components are not MR Safe. All current MR Safe robots are pneumatically actuated, either with special pneumatic cylinders, turbines, or stepper motors. These were commonly powered through long hoses by pneumatic valves, either voice-coil type located outside the MRI room (ACR Zone III), or piezoelectric type valves that may be located in the MR scanner room (ACR Zone IV). Position encoders have been typically done with the classic code-wheel quadrature encoding built with fiber optic sensors, that emit an optical signal through a flexible fiber and recapture it back form another fiber. The fiber sensors were not built for the MR, but a good fit of industrial harsh environment sensors (wet, corrosive, explosive).

Therefore, it would be advantageous to provide a remote center of motion robot that is MR safe.

SUMMARY OF THE INVENTION

The foregoing needs are met, to a great extent, by the present invention, wherein in one aspect a magnetic resonance (MR) safe robot includes a remote center of motion (RCM) mechanism having a non-collinear architecture. An instrument for use with the MR safe robot is aligned between a top joint and an RCM point of the RCM mechanism.

In accordance with an aspect of the present invention, the RCM mechanism takes the form of a parallelogram structure. A link and screw mechanism is configured for driving the RCM mechanism. The RCM mechanism can include a spatial structure. The RCM includes a first set of joints A, $A_1$, and $A_2$ and a second set of joints B, $B_1$, and $B_2$. A first distance between A and $A_1$ is less than a distance between B and $B_1$ and a second distance between $A_1$ and $A_2$ is less than a second distance between $B_1$ and $B_2$. A support arm is configured to attach laterally to a table and provide rotation about a vertical axis located at a center of the table. The MR safe robot can include a needle-guide. The needle-guide includes a protruding surface that is positively engaged by a fixture, and a pin of the needle-guide that is latched within the fixture. The needle-guide can be engaged and detached from the fixture through a bag. A ring is configured to be placed over a needle, such that the ring allows for a depth of needle insertion to be preset. A device to preset a position of the ring includes a motor to set a depth position and copy it onto the position of the ring. A remote device is configured for setting a depth of needle insertion.

In accordance with another aspect of the present invention, an actuation module for use with a magnetic resonance (MR) safe robot includes two coaxially aligned motors. A first of the two coaxially aligned motors is configured to drive a mechanical transmission. A second of the two coaxially aligned motors is configured to pass its output through a bore of the first of the two coaxially aligned motors.

In accordance with yet another aspect of the present invention, the actuation module includes a modular robot structure and a driving mechanism module. The actuation module can also include a kinematic arrangement and a remote center of motion (RCM) mechanism. The RCM mechanism is driven by a link and screw mechanism.

BRIEF DESCRIPTION OF THE DRAWINGS

The accompanying drawings provide visual representations, which will be used to more fully describe the representative embodiments disclosed herein and can be used by those skilled in the art to better understand them and their inherent advantages. In these drawings, like reference numerals identify corresponding elements and:

FIGS. 1A-1C illustrate different types of 1-DoF parallelogram RCM types.

DETAILED DESCRIPTION

Figure 2:
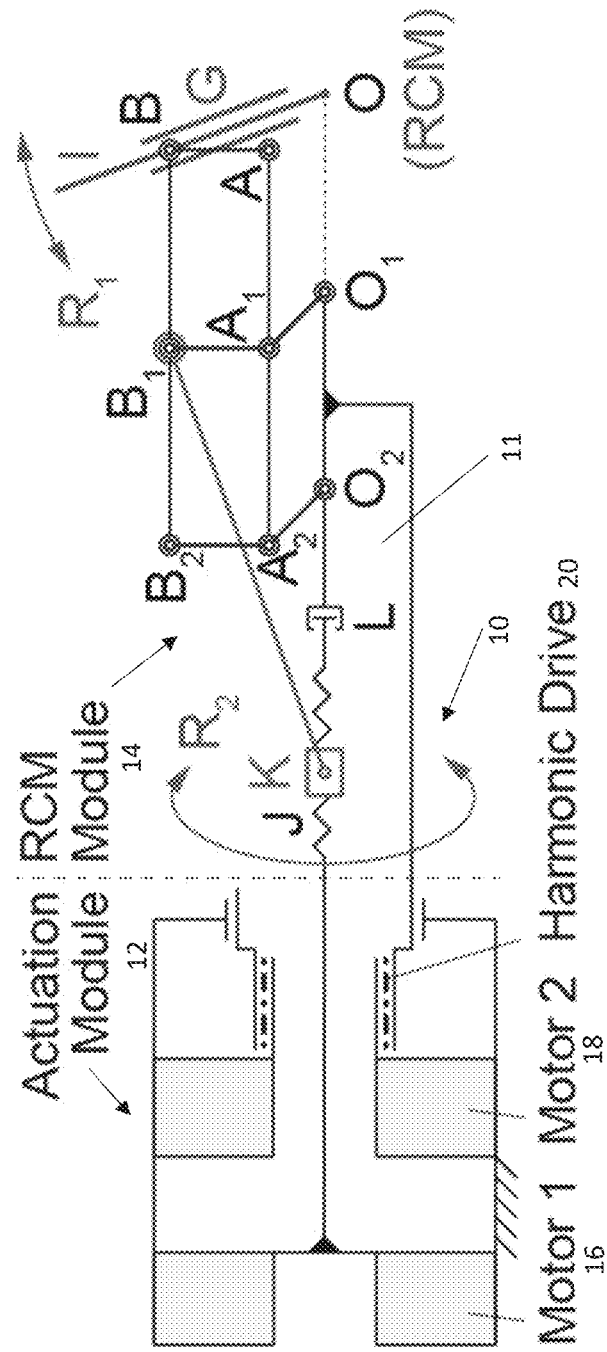
FIG. 2 illustrates a kinematic diagram of the RCM mechanism and an actuation schematic for a robot, in accordance with the present invention.

The presently disclosed subject matter now will be described more fully hereinafter with reference to the accompanying Drawings, in which some, but not all embodiments of the inventions are shown. Like numbers refer to like elements throughout. The presently disclosed subject matter may be embodied in many different forms and should not be construed as limited to the embodiments set forth herein; rather, these embodiments are provided so that this disclosure will satisfy applicable legal requirements. Indeed, many modifications and other embodiments of the presently disclosed subject matter set forth herein will come to mind to one skilled in the art to which the presently disclosed subject matter pertains having the benefit of the teachings presented in the foregoing descriptions and the associated Drawings. Therefore, it is to be understood that the presently disclosed subject matter is not to be limited to the specific embodiments disclosed and that modifications and other embodiments are intended to be included within the scope of the appended claims.

An embodiment in accordance with the present invention provides a remote center of motion robot (RCM). The RCM here is a parallelogram bar type RCM mechanism with a novel joint arrangement. The novel joint arrangement facilitates the mounting of the medical instrument and offers improved clearance relative to the patient. Moreover, the robot was built to guide a bone biopsy cannula, needle, or drill. Even though exact interventional values are unknown, it is expected that the forces exerted laterally on the needle-guide are higher than those encountered for slender needle insertion into soft tissue. For this, the RCM has been built with novel structure to enhance stiffness.

The present invention is directed to a new robotic system for direct image-guided interventions. A manipulator of the present invention uses a pneumatic step motor actuation and is entirely made of electrically nonconductive, nonmetallic, and nonmagnetic materials. Accordingly, the manipulator is MR Safe based on the scientific rationale (ASTM F2503-13). The robot is also compatible with all types of medical imaging equipment, and may operate next to the patient within the gantry with no mutual interference.

The manipulator orients a needle-guide with 2 degrees of freedom (DoF) about a fulcrum point located below the guide using an innovative remote center of motion (RCM) parallelogram type mechanism. In addition, the depth of manual needle insertion is preset with a $3^{rd}$ DoF located aside of the manipulator. The manipulator includes registration markers for image-to-robot registration. Based on the images, the registration markers may be used to guide needles, drills, or other slender instruments on target. For this versatility, special consideration was given to the kinematic accuracy and the structural stiffness, which are documented experimentally. The manipulator of the present invention includes a Remote Center of Motion (RCM) kinematic structure. The RCM kinematic structure allows a medical instrument to pivot about a fulcrum point that is located remotely from the mechanism, typically placed at the skin entry point/port of numerous minimally invasive interventions/operations.

Basic mechanical RCM mechanisms present 2 rotary DoF that intersect at the fulcrum (RCM) point. However, only one of these requires special kinematics, because the second can be simply implemented with a revolute joint whose axis passes the fulcrum. Because only one requires special kinematics, some RCM mechanisms are considered as 1-DoF planar mechanism that implements the actual remote revolute axis.

FIGS. 1A-1C illustrate schematic diagrams of different 1-DoF parallelogram RCM types. The 1-DoF mechanism of prior RCM mechanisms is schematically represented in FIG. 1A. This is a 6-bar linkage with 8 joints. Here, several of the links and joints are redundant. For example, the kinematics of the mechanism is identical if either link $A_1A_2$, or $A_1B_2$, or both $A_2B_2$ and $B_1B_2$ are removed. Therefore, the mechanism uses at least 2 parallelogram 4-bar structures to implement a virtual parallelogram $OAA_1O_1$, which makes link AB rotate about the remote center of motion (RCM) point O. The remote axis of rotation is nomal to the plane of the mechanism at the RCM point O. The use of the redundant parallegogram requires precise manufacturing, but improves structural stiffless. Each of the letters represents a joint and links are listed by their combination of letters.

The end-effector tool/instrument (I) is attached (G, guide) to the link AB and pases the RCM point O. As shown in FIG. 1A, for this RCM type, the points A, B, and O are colinear. Because the instrument (I) must cross the RCM point O, this should be angled relative to AB as shown in the figure, either in the RCM plane or another. The instrument I may be placed parallel to AB if it is in a parallel plane that clears the interference. An example of a robot with this arrangement is the other RCM robot for MRI. Another option is to place the instrument I in a parallel plane to clear the interference.

A variation of the 1-DoF parallelogram RCM mechanism is illustrated in FIG. 1B. Here, the vertical $O_1A_1B_1$ and $O_2A_2B_2$ have been "bent" so that the three joints are non-colinear. As such, the virtual parallelogram is $OBB_1O_1$, which makes the RCM point O non-colinear with AB. This arrangement give more flexibility in mounting the instrument. With this, the instrument may be mounted parallel to AB and in the same plane (OI∥AB), as shown in FIG. 1B. Finally, the non-colinear joint arrangement can also be applied to links $AA_1A_2$ and $BB_1B_2$. As shown in FIG. 1C, this helps to further displace the RCM point in the other direction. A variation of this with link $O_2A_2B_2$ straight, $O_1A_1B_1$ and $AA_1A_2$ bent and non-redundant $A_1A_2B_2B_1$ parallelogram can also be used for an RCM.

For a bone biopsy application, the objective has been to create a structurally stiff robot, to withstand as much as possible the lateral forces exerted by the procedure needle/drill. Because these forces are unknown these are unknown, the design goal was to create the structure as stiff as possible within the MR safe and operation constraints. A possible solution involves small RCM link sizes and a low OA/OB ratio, and the use of a redundant RCM parallelogram.

FIG. 2 illustrates a kinematic diagram of the RCM mechanism and an actuation schematic for a robot, in accordance with the present invention. As illustrated in FIG. 2 the robot 10 includes an actuation module 12 and an RCM module 14. The actuation module 12 includes motor1 16 and motor2 18, in the embodiment illustrated in FIG. 2. However, any suitable number of motors known to or conceivable by one of skill in the art could also be used. A harmonic drive 20 is also included. The RCM module 14 of the present invention uses a vertically, non-collinear joint arrangement, the redundant parallelogram, relatively short distance to the RCM point, and the needle-guide centered on the joint B. The non-collinear arrangement enabled the bottom joint A to be located aside of the needle-guide. The advantages of this unique arrangement will be described further herein.

The parallelogram mechanism generates the primary RCM rotation $R_1$. This is driven by a spinning-screw (J, revolute joint L) sliding-nut (K) drive, linked with revolute joints to $B_1$. The other RCM rotation $R_2$ is implemented by rotating the base 11 of the parallelogram mechanism about an axis that passes the RCM point (coaxial with $OO_1O_2$ for convenience), as shown in FIG. 2. The 2-DoF are actuated by motors located in the actuation module 12 which includes a harmonic drive 20 for $R_2$.

Figure 3:
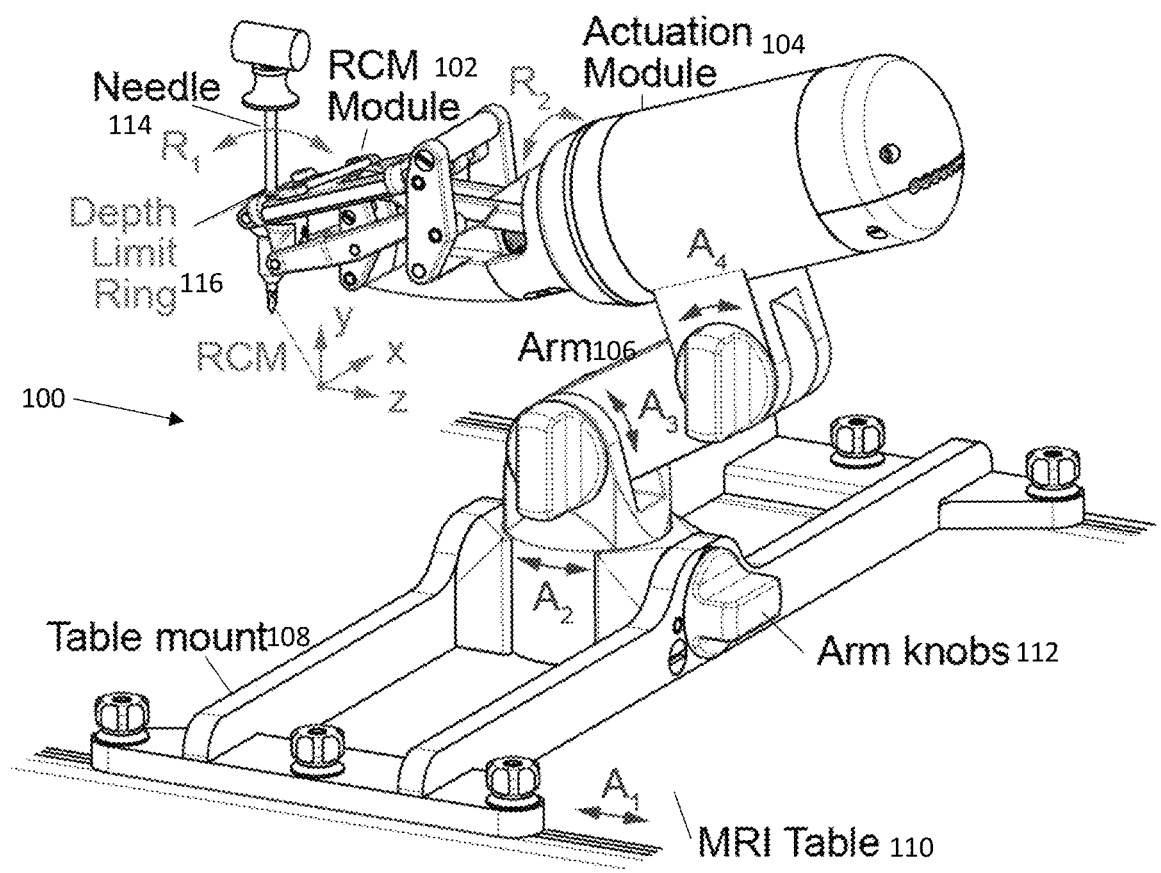
FIG. 3 illustrates a perspective view of a manipulator design according to an embodiment of the present invention.

FIG. 3 illustrates a perspective view of a manipulator design according to an embodiment of the present invention. The manipulator was designed, analyzed, and manufactured with the Creo (PTC, Inc., Needham, MA) software. The manipulator 100 includes the 2-DoF RCM module 102, the actuation module 104, a passive arm 106 with 3 degrees of adjustment (DoA), and a mount 108 that latches onto the channels of the MRI table 110, as illustrated in FIG. 3. The initial position of the robot and respectively its RCM joint can be adjusted with 4-DoA and locked by sliding the base on the table channels ($A_1$) and by adjusting the positions of the arm ($A_{2-4}$), and locking arm knobs 112 by tightening them. The needle 114 includes a depth limiting ring 116.

For versatility, the manipulator is constructed with a modular structure, so that the actuation module could be reused to drive other mechanisms. The actuation module includes two coaxially placed pneumatic stepper motors (Φ70 mm×25 mm, 4°/step, 2 encoder counts/step) and a harmonic drive (49:1 transmission ratio) driven by one of the motors, as illustrated in FIG. 2.

Figure 4:
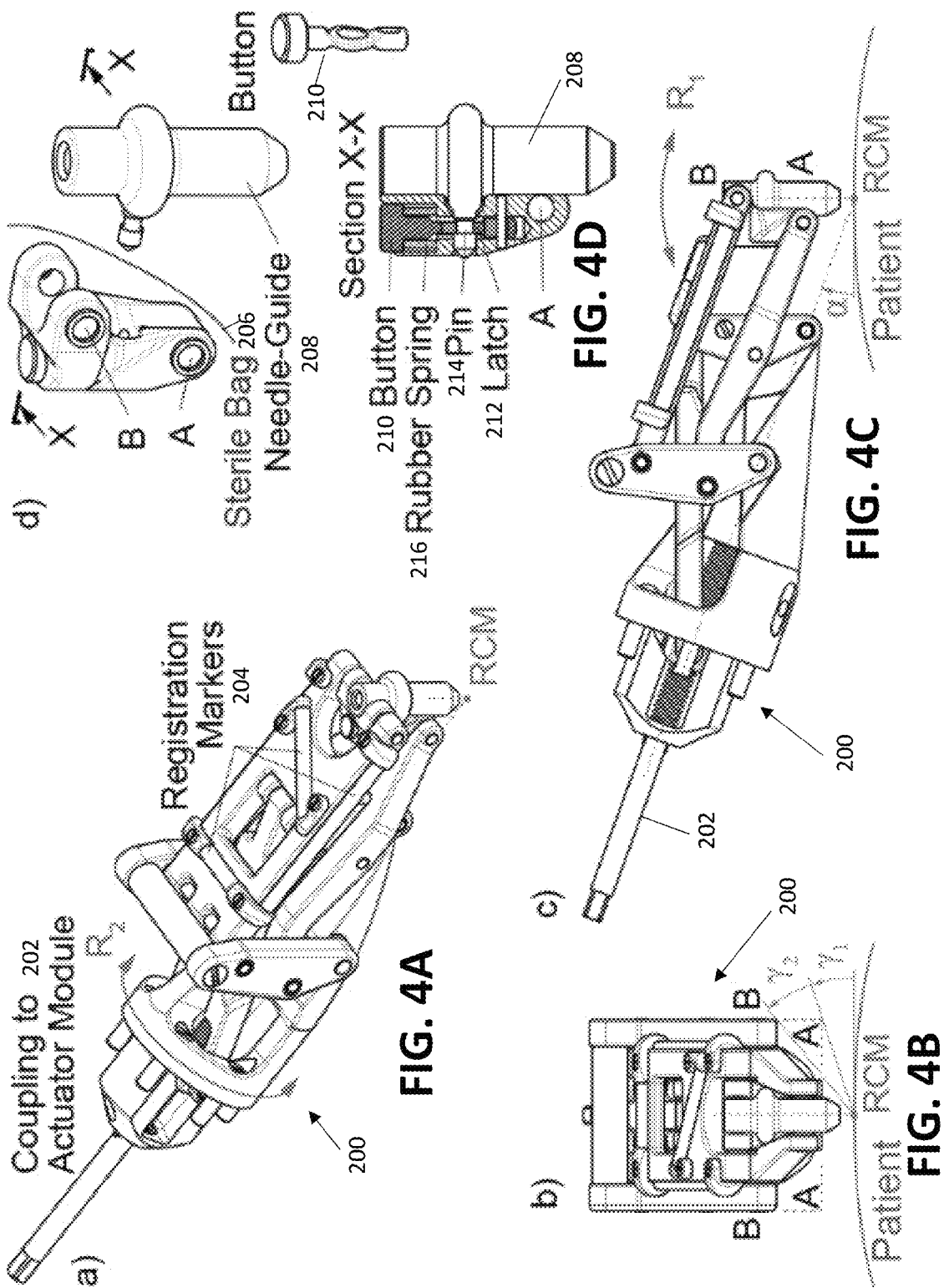
FIGS. 4A-4D illustrate perspective views of an RCM module detached from an actuation base.

FIGS. 4A-4D illustrate perspective views of an RCM module detached from an actuation base. FIGS. 4A-4C illustrate isometric and orthogonal views and FIG. 4D illustrates a needle-guide and latching mechanism, according to an embodiment of the present invention. The RCM module 200 detached from the actuation base is shown in FIG. 4A. As illustrated in FIG. 4A the RCM module 200 includes a coupling 202 for connecting the RCM module 200 to the actuation module (not shown). A set of 4 registration markers 204 has been built into the $BB_2$ link of the RCM module, as shown in FIG. 4A. These are made of glass tubes, currently filled with Radiance® MRI imaging liquid (Beekley, Bristol, CT). The guide is centered on the top joint B by designing the RCM mechanism with a wide structure on both sides of the guide. Joint B is therefore implemented by two coaxial joints BB on the sides, as shown in the RCM module 200 of FIG. 4B. If a collinear RCM mechanism were used, the spacing between the bottom joints AA would have been similar, and the angular clearance with respect to the patient would have been $\gamma_1$. However, the non-collinear design, enabled the two joints A to be located closer, increasing the clearance to $\gamma_2$ (40°)>$\gamma_1$ (20°). In the other direction, clearance with respect to the patient is increased by angling the entire RCM module 200 with angle α (20°), as shown in the RCM module 200 of FIG. 4C. The range of the $R_1$ rotation is −50° to +30° implemented with a custom ACME Φ10×2 mm pitch screw. The step size varies between 0.029-0.044°/step depending on the position of the RCM mechanism. The $R_2$ rotation is unrestricted by the joint, but effectively bounded by the interference with the clinical site (±$\gamma_2$=±40°). Its resolution is 0.082°/step.

For sterilization purposes, the entire device is covered with a sterile bag 206 (Universal Medical EZ-3030). The only component to be sterilized is the needle-guide 208, which can be easily detached by pressing a button 210, as illustrated in FIG. 4D. This includes a pin 212 that pierces the bag and attaches to link AB, which has a concave structure that follows the geometry of the needle-guide 208 to provide a secure and stiff attachment, when the latch 212 of the button engages the pin 214. A rubber spring 216 allows depression of the button to engage the pin 214.

Various needles with diameters up to 10 mm can be manipulated by the robot by adjusting the bore size of the needle-guide. The needle used in the design, illustrated in FIG. 3, is the Invivo 15100 (Schwerin, Germany) MRI bone biopsy set with a cannula diameter of 4.9 mm. However, any suitable needle known to or conceivable by one of skill in the art can also be used.

Figure 5:
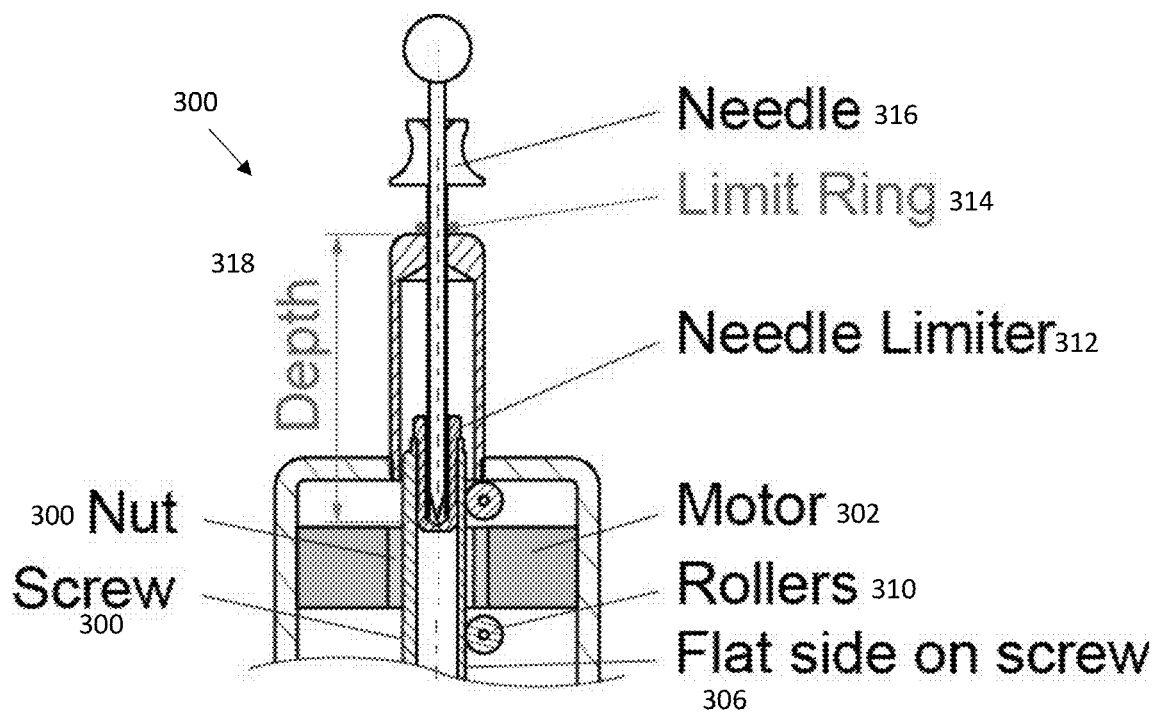
FIG. 5 illustrates a partially sectional view of a depth driver to preset a depth for needle insertion, according to an embodiment of the present invention.
Figure 6:
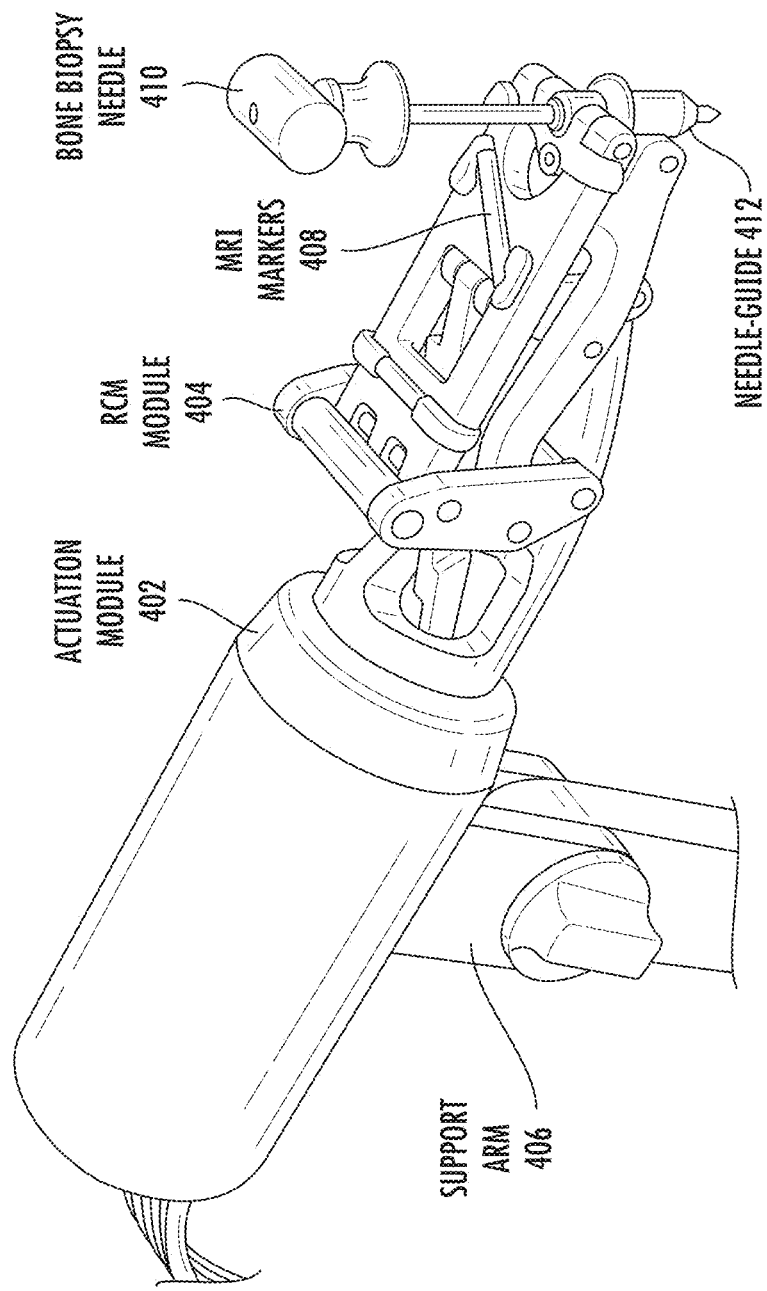
FIG. 6 illustrates an image view of the device according to an embodiment of the present invention.

While the needle is manually inserted through the guide, the maximum depth of insertion may be pre-adjusted by the robot. A depth limiter consisting of a rubber O-ring is placed on the barrel of the needle, as shown in FIGS. 3, 5, and 6. The needle is inserted through the guide until the ring bottoms on the top surface of the guide. To simplify the construction of the manipulator, a separate device, with 1-DoF, is used to adjust the location of the ring on the needle barrel, implementing a remote DoF.

FIG. 5 illustrates a partially sectional view of a depth driver to preset a depth for needle insertion, according to an embodiment of the present invention. The depth driver 300 or depth presetting device includes a third pneumatic stepper motor 302 equipped with a central nut 304 (ACME Φ19×4.5 mm pitch). The nut 304 drives a screw 306 with 3 flat sides 308 at 120° that slide on 6 rollers 310 that implement a prismatic joint. The motor 302 adjusts the location of a needle limiter 312 attached to the screw 306. The limit ring 314 is initially placed on the needle 316 close to the point, and the needle 316 is inserted in the device until its point bottoms on the needle limiter 312. During this motion the limit ring 314 slides on the barrel of the needle 316 up to the depth position 318 that is to preset. The maximum depth of adjustment is 100 mm with a preset depth of 0.05 mm/step. A set of 4 registration markers has been built into the $BB_2$ link of the RCM module as shown in FIG. 4A and FIG. 6. These are made of glass tubes filled with an MR imaging liquid.

FIG. 6 illustrates an image view of the device according to an embodiment of the present invention. The manipulator and depth presetting device including the motors and encoders are entirelly built of electrically nonconductive, nonmetallic, and nonmagnetic materials. These are plastics such as ABS, Acetal Copolymer, Delrin, Nylon 6, Peek 1000, Polycarbonate, Polyetherimide (Ultem 1000), Polyimide, Polyethersulfone (Radel), PTFE (Teflon), rubber, composites such as Garolite, Torlon Polyamide-imide, glass, and high-alumina ceramic. In addition to mechanical property considerations, material selection included high electrical resistivity and dielectric strength considerations. The links of the RCM are built of Garolite and Ultem, the pins of the joints are made of Garolite rods, with "tight" Delrin bushings. The needle-guide, which is the only part that comes in direct contact with the patient was built of material with ISO-10993 biocompatible certification, specifically of Radel BL033. The robot 400 includes the actuation module 402 and the RCM module 404. A support arm 406 holds up the actuation module and couples it to the MRI table or other surface. The MRI markers 408 are described in further detail above. The biopsy needle 410 and needle guide 412 are positioned at the distal end of the RCM module 404.

Figure 7:
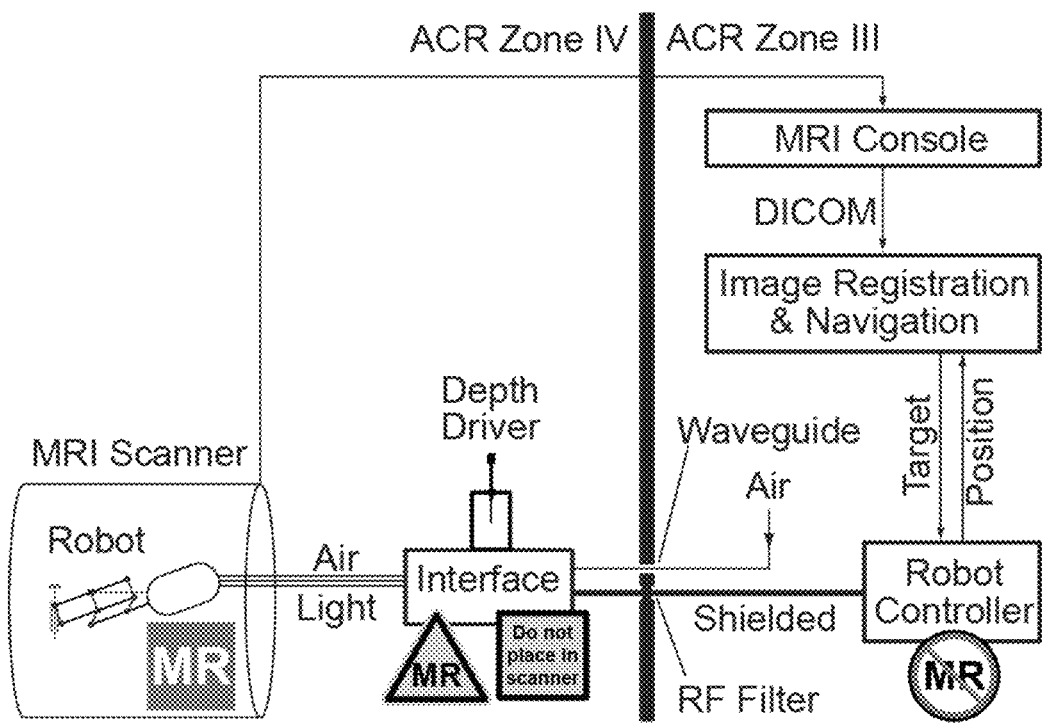
FIG. 7 illustrates a schematic diagram the robotic system showing placement of MR safe, conditional and unsafe components.

FIG. 7 illustrates a schematic diagram the robotic system showing placement of MR safe, conditional and unsafe components. The Robot Controller is a PC (Microsoft Corp.) and equipped with a motion control card (MC4000, PMDI, Victoria, BC, Canada). Any other suitable computing device known to or conceivable by one of skill in the art could also be used. The Controller is MR-Unsafe and must remain outside the ACR (American College of Radiology) Zone IV (scanner room), in the ACR Zone III (control room or equipment room).

An electro-pneumatic and electro-optical Interface to the three pneumatic stepper motors is located in the scanner room (ACR Zone IV) but outside the 0.5 mTesla (5 Gauss) line. The interface is nonmagnetic but uses electricity. For each of the 3 axes, it includes a pneumatic stepper motor driver, 3 piezoelectric valves (Hoerbiger PS10021-641A, Germany), and 2 fiber optic sensors (D10 Expert, Banner Engineering, Minneapolis, MN). The 2 robot axes have no limit switches (hardware stop used to home), but an additional fiber optic sensor is used to home the depth driver. The interface also includes an emergency button and status LEDs.

The Depth Driver is conveniently mounted on top of the Interface box. The Interface is connected with 3m long hoses to the robot and with DB25 cables (through RF Shield) to the Controller. Motion control, safety, and robot kinematics are implemented on the Robot controller PC under C++ (Visual Studio 2015, Microsoft Corp.) using libraries of the MCC. Safety features include a watchdog, emergency stop buttons, and visual alerts. The watchdog (built on hardware and software) checks the state of several components of the system at 6 Hz, disabling power to the pneumatic valves of the electro-pneumatic interface, should a faulty condition occur.

Images are transferred over the network in DICOM format (Digital Imaging and Communications in Medicine) to the Image Registration & Navigation controller implemented on another PC. Image-to-robot registration of the set of markers of the RCM is used to register the robot and MRI spaces. While our previous imaging programs were based on the Amira Visualization software (Visage Imaging, San Diego, CA). New for this robot, C++ programs were developed using the open source VTK and ITK toolkits and the GDCM open library for DICOM processing. A CAD model of the markers in the robot coordinate system is superimposed over the MR image of the markers to derive the registration matrix. This enables the conversion of points between the two coordinate systems.

Bench tests of the robot have been completed for motion precision, accuracy, and structural stiffness. A Polaris optical tracker (NDI, Canada) was used to measure the actual location of a passive marker placed on a rod attached to the needle-guide. Under careful measurement conditions, the accuracy of this optical tracker is as low as 0.055 mm. Experimental results showed an angular accuracy of 0.177° and a precision of 0.077°. For a 50 mm deep target, the positioning accuracy is 0.155 mm and the precision is 0.067 mm. The stiffness of the mechanical structure has been measured with a force gauge and a micrometer which showed a structural stiffness of 34.5N/mm at the needle-guide.

The robot includes high contrast MRI markers for registration (filled with MR-Spots contrast, Beekley, Bristol, CT). A custom image-to-model registration algorithm and image-guided control software was developed. Initial tests were conducted in a Siemens MAGNETOM Tim4G scanner. Images of a gelatin mockup were acquired together with the robot. These initial tests showed no apparent image artifacts or problems in operating the robot within the MRI.

The movement and actuation of the present invention can be carried out using a computer, non-transitory computer readable medium, or alternately a computing device or non-transitory computer readable medium incorporated into the robotic device or the imaging device.

A non-transitory computer readable medium is understood to mean any article of manufacture that can be read by a computer. Such non-transitory computer readable media includes, but is not limited to, magnetic media, such as a floppy disk, flexible disk, hard disk, reel-to-reel tape, cartridge tape, cassette tape or cards, optical media such as CD-ROM, writable compact disc, magneto-optical media in disc, tape or card form, and paper media, such as punched cards and paper tape. The computing device can be a special computer designed specifically for this purpose. The computing device can be unique to the present invention and designed specifically to carry out the method of the present invention. The computing device can also take the form of an operating console computer for the imaging device or the robotic device. The operating console for the imaging device or the robotic device is a non-generic computer specifically designed by the manufacturer. It is not a standard business or personal computer that can be purchased at a local store. Additionally, the console computer can carry out communications with the scanner through the execution of proprietary custom built software that is designed and written by the manufacturer for the computer hardware to specifically operate the hardware.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A robot comprising:
    a remote center of motion (RCM) mechanism having a parallelogram structure comprising non-collinear joints, and wherein the non-collinear joints are connected by links, such that the links form sides of the parallelogram structure and the non-collinear joints form vertices of the parallelogram structure, and wherein the joints are configured for non collinear pivoting in both vertical and horizontal planes, and wherein the RCM comprises a base for the parallelogram structure;
    wherein an instrument for use with the robot is aligned between a joint of the non-collinear joints and an RCM point of the RCM mechanism; and,
    an actuation module having a motor and a harmonic drive configured for generating motion in the RCM mechanism and for rotating the base of the parallelogram structure about an axis that passes the RCM point.

2. The robot of claim 1, wherein the parallelogram structure includes redundant parallelogram components.

3. The robot of claim 1 wherein the RCM further comprises two degrees-of-freedom.

4. The robot of claim 3 further comprising a first set of joints of the non-collinear joints (A, $A_1$, and $A_2$) a second set of joints of the non-collinear joints (B, $B_1$, and $B_2$), and a third set of base joints (O, $O_1$, and $O_2$, where O is the RCM point) wherein a first distance between A and $A_1$ is less than a distance between B and $B_1$ and a second distance between $A_1$ and $A_2$ is less than a second distance between and $B_1$ and $B_2$.

5. The robot of claim 1 further comprising a support arm configured to attach to a table and provide rotation about a vertical axis.

6. The robot of claim 1 further comprising a needle-guide.

7. The robot of claim 6 wherein the needle-guide can be engaged and detached from a fixture through a bag.

8. The robot of claim 6 further comprising a ring configured to be placed over a needle, such that the ring allows for a depth of needle insertion to be preset.

9. The robot of claim 8 further comprising a device to preset a position of the ring wherein the device comprises a motor to set a depth position and copy it onto the position of the ring.

10. The robot of claim 9 further comprising a remote device configured for setting a depth of needle insertion.

11. The robot of claim 1 wherein the robot is configured to be safe for use with magnetic resonance (MR).

* * * * *